E. J. JOHNSON.
TIRE TOOL.
APPLICATION FILED FEB. 23, 1922.
1,431,002.
Patented Oct. 3, 1922.
2 SHEETS—SHEET 1.
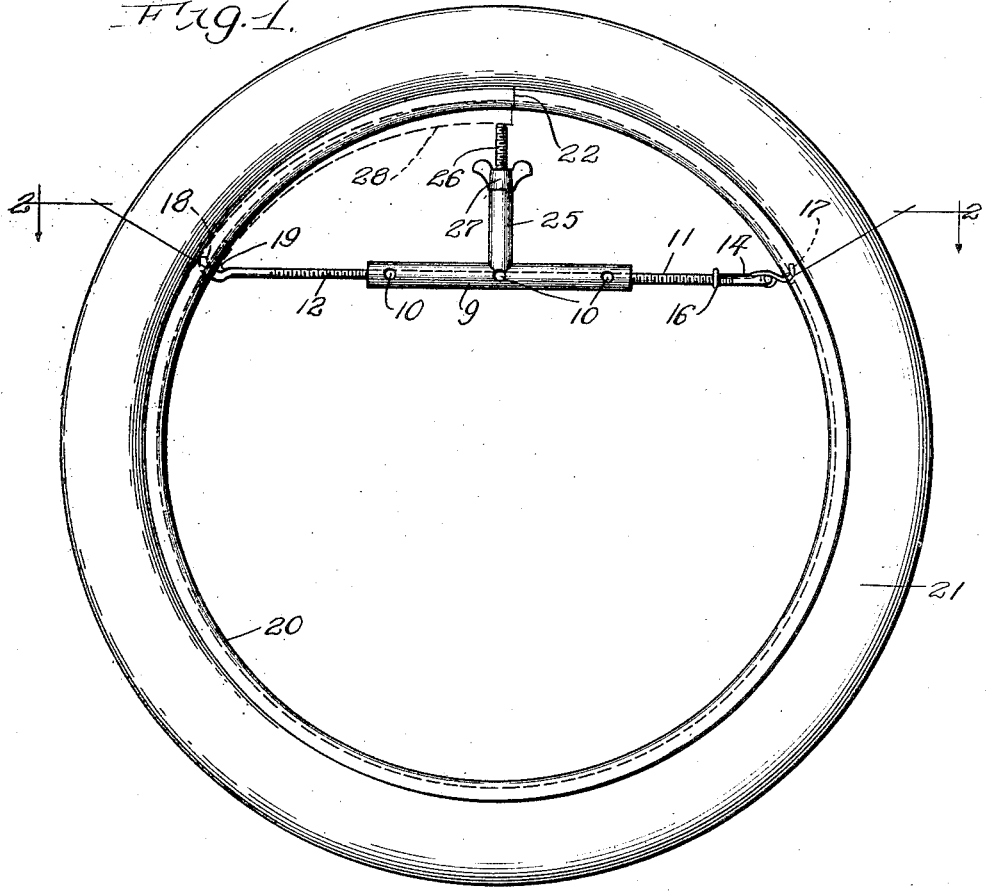
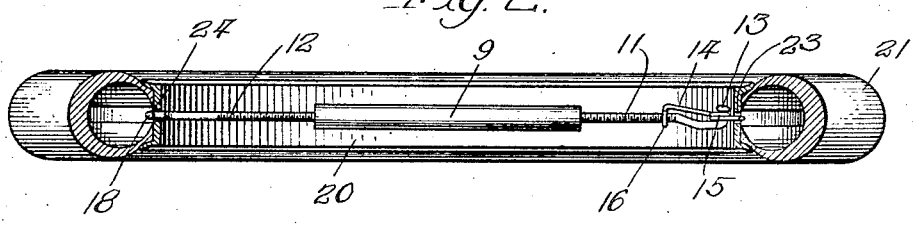
Inventor,
Eric J. Johnson,
By Dyrenforth, Lee, Chritton & Wiles,
Attys.

E. J. JOHNSON.
TIRE TOOL.
APPLICATION FILED FEB. 23, 1922.
1,431,002.
Patented Oct. 3, 1922.
2 SHEETS—SHEET 2.
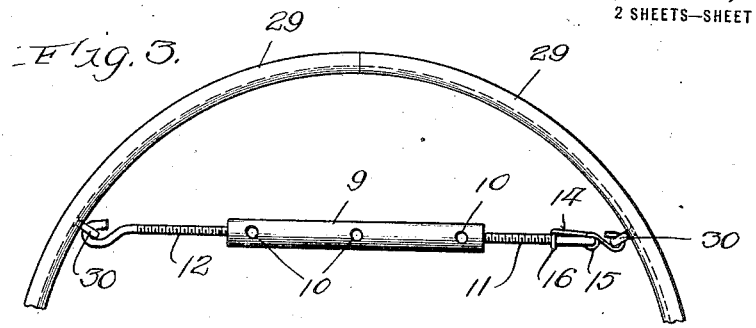
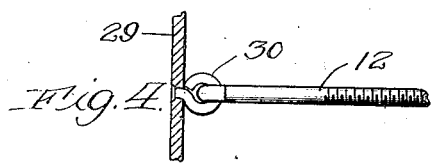
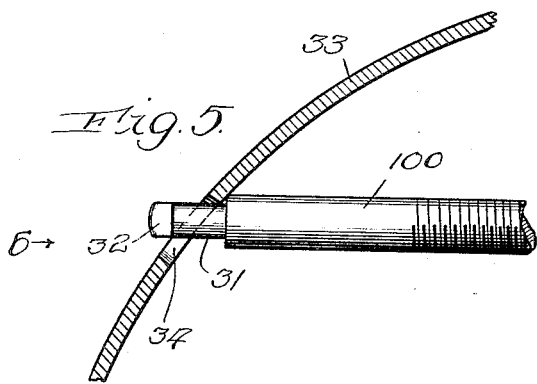
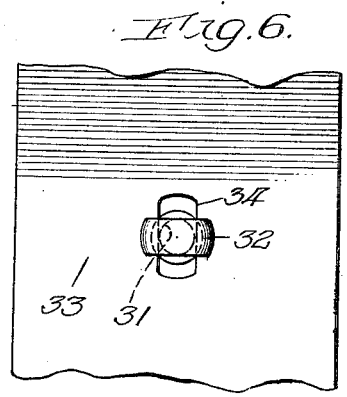
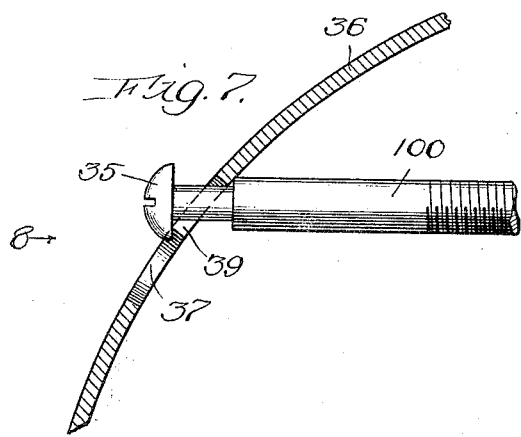
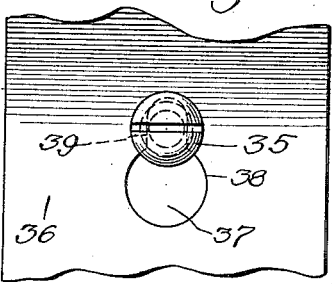
Inventor,
Eric J. Johnson,
By Dyrenforth, Lee, Chritton & Wiles,
Attys.

Patented Oct. 3, 1922.

1,431,002

UNITED STATES PATENT OFFICE.

ERIC J. JOHNSON, OF CHICAGO, ILLINOIS.

TIRE TOOL.

Application filed February 23, 1922. Serial No. 538,617.

*To all whom it may concern:*

Be it known that I, ERIC J. JOHNSON, a citizen of the United States, residing at Chicago, in the county of Cook and State of Illinois, have invented a new and useful Improvement in Tire Tools, of which the following is a specification.

My invention relates more particularly to tools for use in connection with the demountable rims of pneumatic-tire-equipped wheels of the split type requiring for the disassembly therefrom of the tires, the springing of one end of the rim at its split portion, toward the center of the rim, relative to the other end of the rim, and the contracting of the end portions of the rim, and the reverse operation in the assembling therewith of a tire.

I have devised my improved tire tool for use not only in the removal of a tire from the rim, but also to the application of a tire thereto, though as to certain features of the device, they may be incorporated in a tool adapted only for the removal of a tire from the rim, and as to other features thereof to the application of a tire to the rim.

My primary objects are to provide a novel, simple and economical construction of tire tool, which may be readily applied to position, will operate positively, and the parts of which may be adjusted to cause the device to occupy a relatively small amount of space when not in use.

Referring to the accompanying drawings wherein my invention is shown as embodied in a tire tool adapted for use not only in removing a tire from the rim, but also in applying a tire thereto:

Figure 1 is a face view of a demountable rim of the split type equipped with a tire to be removed therefrom, with my improved tire tool shown in position thereon, the part of the tool for use in forcing one of the free ends of the rim, into proper position on the tire, being also represented.

Figure 2 is a section taken at the irregular line 2—2 on Fig. 1 and viewed in the direction of the arrows, the tool being shown in plan. Figure 3 is a view in side elevation of a portion of a split rim, showing a modification of the construction of the preceding figures. Figure 4 is a broken enlarged detail of a portion of the structure at the left hand side of Fig. 3. Figure 5 is a broken view showing another modification of the structure, the rim being shown in section. Figure 6 is a view of the structure shown in Fig. 5 viewed in the direction of the arrow 6 in this figure. Figure 7 is a view like Fig. 5 of still another embodiment of the invention and involving a modification of the rim; and Figure 8, a view taken at the arrow 8 in Fig. 7.

Referring first to the construction shown in Figs. 1 and 2, the tire tool comprises a member 9 shown as in the form of an open-ended cylindrical tube containing cross-openings 10 therein into either one of which a rod, not shown, may be inserted to aid in the turning of this member for the purpose set forth, the device being in the nature of a turnbuckle. The opposite ends of the tube 9 are internally screw-threaded to present right and left threads, and screwing into these threaded portions, are rods 11 and 12 for interlockingly engaging a rim to be manipulated. The outer extremity of the rod 11 is bent to form a laterally-extending headed portion 13 forming a pivotal support for a rock member 14 shown as formed of a rod bent between its ends to form a spiral 15 at which it surrounds, and is confined on, the portion 13. One end of the member 14 is in the form of an open loop 16 adapted to cooperate with the body portion of the rod 11 as shown in the drawings, and the opposite end thereof is in the form of a hook, represented at 17. The outer end of the rod 12 is so shaped as to present the laterally-extending portion '18 at its extremity and a shoulder 19 spaced therefrom.

The tool described is provided, more particularly, to be used in connection with a rim containing openings in the free end portions thereof and interlock with the walls of these openings to perform the functions hereinafter explained. In the drawings such a rim is represented at 20 it being shown as equipped with a tire 21, the cross-joint of the rim being represented at 22 and the openings therein, and above referred to, at 23 and 24.

In the use of the tool the extremity of the rod 12 would be introduced into the opening 23 to the position shown in Fig. 1 and the hook 17 into the opening 23, as shown, and upon turning the member 9 in one direction the rods 11 and 12 will be drawn together and, through the interlocking engagement thereof with the surfaces of the rim at its outer periphery, will operate to contract the rim, the operator having deflected one of the free ends thereof so that it will pass the adjacent extremity of the other free end of the rim, whereupon the tire will be removed as in accordance with common practice.

It is desirable that the tool as described be assembled with the rim, to the position stated, without disengaging either of the rods 11 and 12 from the member 9, and to this end the member 14 is provided as stated. In thus assembling the tool with the rim the extremity of the rod 12 would be introduced into the opening 24 generally to the position shown in Fig. 1, and the member 14, preliminarily adjusted on the portion 13 to a position in which the loop 16 is out of rod-embracing position, rocked on the portion 13 to permit the hook 17 to be introduced into the opening 23 and thereupon adjusted on the rod 11 to cause the loop 16 to be interlocked with this rod as shown in Figs. 1 and 2.

The tool described is also adapted to expand a rim to assemble it with a tire, this being accomplished by rotating the member 9 reversely to that described for contracting the rim, whereby the rods 11 and 12 are forced outwardly in a direction away from each other and serve to exert the desired expanding pressure against the free ends of the rim, by the engagement of the shoulder 19 and the coiled portion 15 of the member 14, with the surfaces at the inner periphery of the rim.

It often happens that one of the free ends of the rim, in the expanding operation stated, does not spring outwardly into place against the tire, but it is required to be forced to such position, and the device shown is also provided with means for this purpose. These means just referred to comprise a hollow member 25 adapted to seat at one end, which is curved for this purpose, against the side of the member 9, the inner surface of this member being non-circular, as for example of elliptical form in cross-section. These means also comprise a threaded rod 26 which extends into the hollow member 25 and is movable lengthwise in the latter, the inner end of this rod being formed with a head (not shown) of such size and shape that it will engage the inner wall of the member 25 and prevent the rod from turning; and a wing-nut 27 screwing upon the rod 26 and against the outer end of the member 25. In the use of the means just referred to, the member 25 is positioned as stated and shown in Fig. 1, in which position the outer end of the rod 26 engages the inner peripheral surface of the one of the free ends of the rim to be forced to position, such a free end being illustrated by dotted lines at 28. With the tire tool comprising the parts 9, 11 and 12 positioned as shown in Fig. 1 and the means referred to assembled therewith, as shown in this figure, the operator rotates the nut 27 in a direction to force the rod 26 outwardly, thereby forcing the rim end 26 into the full line position shown in Fig. 1.

Openings to receive ends of the tire tool for effecting the desired interlocking of the tool with the rim ends may be provided otherwise than merely making holes in the rim as explained of the construction shown in Figs. 1 and 2. Figure 3 illustrating one modification in this particular, wherein the ends of the rim, at the split portion thereof, and represented at 29, are provided with eyes represented at 30 and which may be secured thereto as shown in Fig. 4. Where the openings referred to are provided by eyes, such as the eyes 30, it is preferred that the extremities of the tire tool be formed with hooks more nearly like eyes than in the case of the construction shown in Fig. 1, as shown in Fig. 3, in order that danger of these hook ends disengaging from the eyes 30 in the use of the tool for expanding the rim, be reduced to the minimum, it being understood that in this expanding operation the extreme end surfaces of these hook portions bear against the inner surfaces of the eyes 30.

Referring to Figs. 5 and 6, still another modification of the tire tool is illustrated. In this case the rods which are threaded into the opposite ends of the member 9, the one of the rods shown being represented at 100, are of the same construction, each being formed at its outer end with a shank 31 of reduced diameter terminating in a flat head 32. The rim ends, one of which is represented at 33, each contains an elongated slot 34 with its long dimension shown as extending circumferentially of the rim, the width of the slots 34 being slightly greater than the diameter of the shank 31 and the width of the head 32 at its smaller dimension, but narrower than the width of the head 32 at its longest dimension. Thus to assemble the tire tool with the rim, the rods 100 are inserted into the openings 34 in the rim and rotated, to assume the position shown in Fig. 5, in which position they interlock with the rim adapting the tool to expand or contract the rim depending upon the direction in which the member 9 is rotated.

The construction illustrated in Figs. 7 and 8 is the same as that shown in Fig. 5 and above described, except that instead of providing the flat heads 32 at the outer ends of the rods 100, round heads, represented at 35, are provided, and the ends of the rim, one thereof being shown at 36, instead of containing the elongated slots 34 having formed therin key slots 37 affording the relatively large opening 38 of a dimension slightly greater than the dimension of the head 35, and the relatively narrow portion 39 of less width than the diameter of the head 35, adapting the extremities of the rods 100 to be inserted at their heads 35 through the rim ends, and upon being shifted to the position shown in Fig. 7 of the one therein shown, interlock with the rim as shown, whereby the tool is adapted to be used for expanding or contracting the rim at will.

It will be understood that the means of which the member 25 is a part and provided for forcing a rim end to proper position relative to the tire in the assembling of the rim and tire, as hereinbefore explained, may be used with all of the various forms of tire tools illustrated and described.

A tire tool embodying my invention is not only of simple and inexpensive construction and adapted to serve the purposes hereinbefore described, in a highly satisfactory manner, but may be readily disassembled to occupy a comparatively small space, which is an advantage, as it may be very conveniently stored in the place usually provided in automobiles for carrying tools.

While I have described my invention as applied to a tool adapted to be used in either assembling or disassembling a rim and tire, I do not wish to be understood as intending to limit it thereto. Furthermore, the invention may be embodied in other forms, in addition to those shown, without departing from the spirit of my invention.

What I claim as new, and desire to secure by Letters Patent, is:

1. A tire tool for a split rim comprising members connected together and relatively movable toward and away from each other, one of said members having a section movable thereon, the outer end of said section and the other of said members having shoulder portions at which they are adapted to extend into apertures presented by the rim at the free ends thereof and interlock with said rim to move the ends of the latter relative to each other in the relative movement of said member, said section having a loop for receiving the part carrying said section, and at its outer end being formed with an aperture-engaging projection forming one of said shoulders.

2. A tire tool for a split rim comprising a member having oppositely-extending threaded portions, said threads being right and left threads, respectively, and rim-engaging threaded members engaging the threads of said first-named member, one of said members being provided at its extremity with shoulder portions spaced apart and adapted to be positioned in an aperture in a rim to straddle the wall of the aperture at said shoulder portions, and the other of said members being formed with a section pivotally connected therewith, said section being provided at its inner end with a loop adapted to receive the part carrying said section and presenting shoulders spaced apart at its outer end at which it is adapted to be inserted into another aperture in the rim to straddle the wall of this aperture at its spaced-apart shoulders.

ERIC J. JOHNSON.